United States Patent
Thompson et al.

(10) Patent No.: US 6,173,793 B1
(45) Date of Patent: Jan. 16, 2001

(54) MEASUREMENT-WHILE-DRILLING DEVICES WITH PAD MOUNTED SENSORS

(75) Inventors: Larry W. Thompson, Willis; Macmillan M. Wisler, Kingwood; Paul Seaton, The Woodlands, all of TX (US)

(73) Assignee: Baker Hughes Incorporated, Houston, TX (US)

( * ) Notice: Under 35 U.S.C. 154(b), the term of this patent shall be extended for 0 days.

(21) Appl. No.: 09/215,715

(22) Filed: Dec. 18, 1998

Related U.S. Application Data

(60) Provisional application No. 60/070,933, filed on Dec. 18, 1997.

(51) Int. Cl.$^7$ .................................................. E21B 7/06
(52) U.S. Cl. .................................. 175/45; 175/24; 175/76
(58) Field of Search ................................ 175/45, 24, 61, 175/73, 76, 326, 325.3, 325.4, 27

(56) References Cited

U.S. PATENT DOCUMENTS

| | | | |
|---|---|---|---|
| 5,339,036 | 8/1994 | Clark et al. | 324/338 |
| 5,341,886 | 8/1994 | Patton | 175/24 |
| 5,458,208 | 10/1995 | Clarke | 175/45 |
| 5,507,353 | 4/1996 | Pavone . | |
| 5,603,386 | 2/1997 | Webster . | |

FOREIGN PATENT DOCUMENTS

| | | | |
|---|---|---|---|
| 0417001A2 | * 3/1991 | (EP) . | |
| 0594419A1 | * 4/1994 | (EP) . | |
| 2251014 | 12/1990 | (GB) . | |
| 2311796 | 3/1996 | (GB) . | |
| 2305196 | 9/1996 | (GB) . | |

* cited by examiner

*Primary Examiner*—Robert E. Pezzuto
(74) *Attorney, Agent, or Firm*—Madan, Mossman, & Sriram, P.C.

(57) ABSTRACT

A Measurement-while-Drilling method and apparatus for obtaining information about a formation uses sensors on substantially non-rotating pads attached to a rotating housing that is part of the drilling assembly. The pads make contact with the formation. The sensors may be density, NMR, resistivity, sonic or electromagnetic. The NMR sensors may use a static magnetic field that can be either radial or longitudinal in direction. The resistivity sensors may involve direct measurement of leakage current or may rely on induction methods. The sonic sensors may be three component transmitters and/or receivers for determining compressional and shear velocities of the formation and may also be used to image the formation in a VSP or a reverse VSP. In an alternate arrangement, the sensors rotate with the drill bit. A downhole microprocessor analyzes the data to improve signal-to-noise ratio and to reduce redundancy in the acquired data. Depth information may be telemetered from an uphole controller to facilitate the process. The downhole processor has adequate memory to store the processed data for subsequent retrieval when the well is being tripped. Alternatively, a subset of the stored data may be telemetered uphole during the drilling process.

40 Claims, 13 Drawing Sheets

MEASUREMENT-WHILE-DRILLING DEVICES WITH PAD MOUNTED SENSORS

CROSS REFERENCE TO RELATED APPLICATIONS

This application claims priority from U.S. Provisional Patent Application No. 60/070,933 filed on Dec. 18, 1997.

FIELD OF THE INVENTION

This invention relates to the acquisition and processing of data acquired by a measurement-while-drilling (MWD) tool during the drilling of a wellbore. More particularly, the invention relates to methods and devices for acquiring data downhole using sensors in contact with the borehole wall, processing the data and transmitting to the surface, in real-time, parameters of the formation penetrated by the borehole as the borehole is being drilled using MWD telemetry.

BACKGROUND OF THE INVENTION

Modern well drilling techniques, particularly those concerned with the drilling of oil and gas wells, involve the use of several different measurement and telemetry systems to provide petrophysical data and data regarding drilling mechanics during the drilling process. Data is acquired by sensors located in the drill string near the bit and either stored in downhole memory or transmitted to the surface using MWD telemetry devices. Prior art discloses the use of a downhole device incorporating resistivity, gravity and magnetic measurements on a rotating drillstring. A downhole processor uses the gravity and magnetic data to determine the orientation of the drill string and, using measurements from the resistivity device, makes measurements of formation resistivity at time intervals selected to give measurements spaced around the borehole. These data are compressed and transmitted uphole by a mud pulse telemetry system. The depth of the resistivity sensor is computed at the surface and the data are decompressed to give a resistivity image of the face of the borehole wall with an azimuthal resolution of 30°.

Prior art methods are limited to making resistivity measurements in the subsurface and fail to address the issue of other useful measurements that could be made using an MWD device. Prior art devices are also limited to measurement devices that rotate with the drill string and do not take advantage of current drilling methods wherein a mud motor is used and the drill bit could be rotating at a different speed from the drill string or wherein a non-rotating sleeve may be available on which substantially non-rotating measuring devices could be located. The rate at which measurements are made is selected to be constrained by the data transmission rate of the telemetry system. Prior art systems thus fail to take advantage of the inherently higher capability of measuring devices and the ability to use redundant data to improve the signal-to-noise (S/N) ratio. Prior art also relies on an uphole determination of the depth of the tool, whereas if the determination of the depth of the tool were made downhole intelligent decisions could be made about the amount of data to transmit uphole. The present invention overcomes these inadequacies.

SUMMARY OF THE INVENTION

The present invention is an apparatus and method of making measurements of a plurality of parameters of interest of the formation surrounding a borehole. In one aspect of the invention, the drill bit is mounted on a rotating drillstring and the downhole assembly is provided with sensors that rotate with the drillstring to make measurements of the parameters of interest. The assembly is provided with magnetic and inertial sensors to provide information on the orientation of the measurement sensors. A telemetry system sends information downhole about the depth of the drilling assembly. A processor downhole combines the depth and azimuth information with the measurements made by the rotating sensors, uses redundancy in the data to improve S/N ratio, compresses the data and sends it uphole by a telemetry system or stores it downhole for later retrieval.

In another aspect of the invention, the drill bit is driven by a downhole drilling motor. The motor may be on a rotating drillstring or on coiled tubing. The sensors for measuring the parameters of interest could be rotating with the drill bit. Alternatively, the sensors could have one of several configurations. In one configuration, the sensors are mounted on a substantially non-rotating sleeve; in another configuration, the sensors are mounted on pads that could be rotating or non-rotating, the pads being hydraulically or mechanically actuated to make contact with the borehole wall; in yet another configuration, the sensors are mounted on substantially non-rotating rib-steering devices used to control the direction of the downhole drilling tool. In any of these arrangements, the downhole assembly is provided with sensors that make measurements of the parameters of interest. The assembly is provided with magnetic and inertial sensors to provide information on the orientation of the measurement sensors. A telemetry system sends information downhole about the depth of the drilling assembly. A microprocessor downhole combines the depth and azimuth information with the measurements made by the rotating sensors, uses redundancy in the data to improve S/N ratio, compresses the data and sends it uphole by a telemetry system. The parameters of interest include resistivity, density, compressional and shear wave velocity and structure, dipmeter, acoustic porosity, NMR properties and seismic images of the formation.

As a backup to, or independently of, obtaining the depth information by downhole telemetry, the present invention also provides a capability in the downhole microprocessor to use measurements from sensors at more than one depth to provide a rate of penetration.

DETAILED DESCRIPTION OF THE INVENTION

Figure 1:
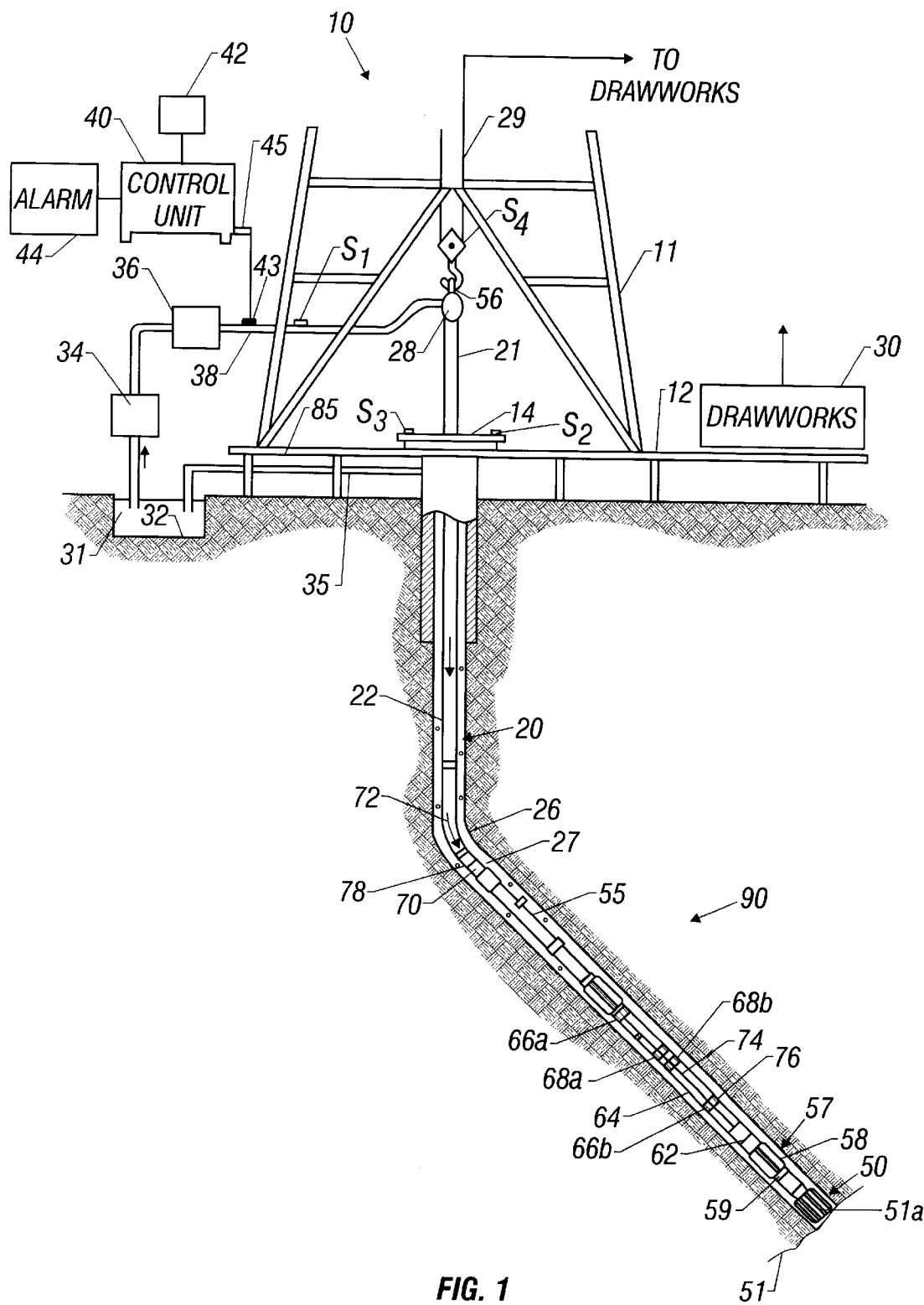
FIG. 1 is a schematic illustration of a drilling system.

FIG. 1 shows a schematic diagram of a drilling system 10 having a drilling assembly 90 shown conveyed in a borehole 26 for drilling the wellbore. The drilling system 10 includes a conventional derrick 11 erected on a floor 12 which supports a rotary table 14 that is rotated by a prime mover such as an electric motor (not shown) at a desired rotational speed. The drill string 20 includes a drill pipe 22 extending downward from the rotary table 14 into the borehole 26. The drill bit 50 attached to the end of the drill string breaks up the geological formations when it is rotated to drill the borehole 26. The drill string 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through the drill string by a mud pump 34. The drilling fluid passes from the mud pump 34 into the drill string 20 via a desurger 36, fluid line 38 and Kelly joint 21. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. A sensor $S_1$ preferably placed in the line 38 provides information about the fluid flow rate. A surface torque sensor $S_2$ and a sensor $S_3$ associated with the drill string 20 respectively provide information about the torque and rotational speed of the drill string. Additionally, a sensor (not shown) associated with line 29 is used to provide the hook load of the drill string 20.

In one embodiment of the invention, the drill bit 50 is rotated by only rotating the drill pipe 52. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. The drilling sensor module processes the sensor information and transmits it to the surface control unit 40 via a suitable telemetry system 72.

Figure 2:
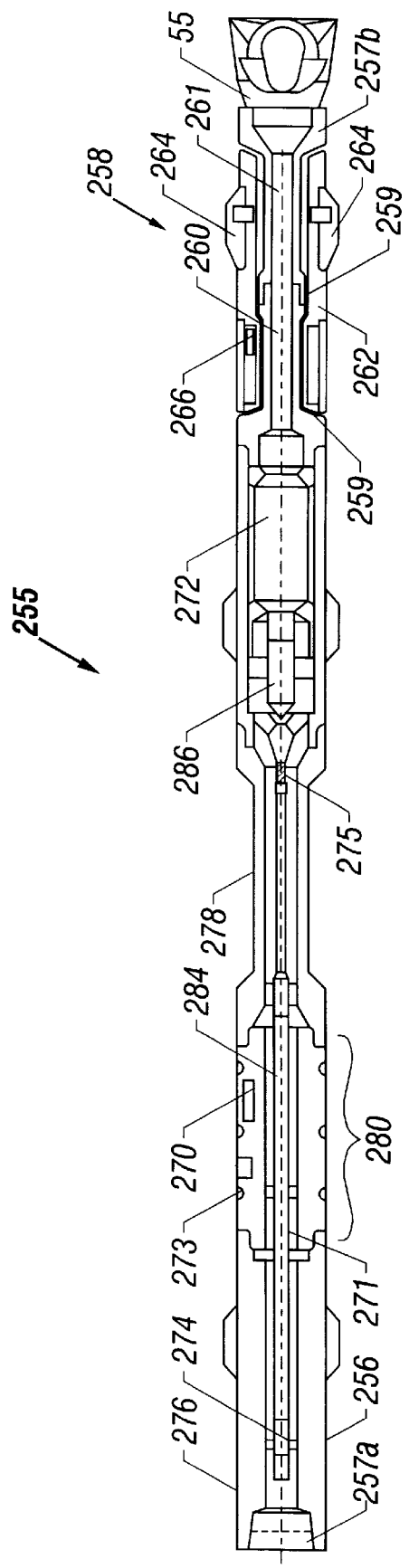
FIG. 2 illustrates a drilling assembly for use with a surface rotary system for drilling boreholes wherein the drilling assembly has a non-rotating sleeve for effecting directional changes downhole.

FIG. 2 shows a schematic diagram of a rotary drilling assembly 255 conveyable downhole by a drill pipe (not shown) that includes a device for changing drilling direction without stopping the drilling operations for use in the drilling system 10 shown in FIG. 1. The drilling assembly 255 has an outer housing 256 with an upper joint 257a for connection to the drill pipe (not shown) and a lower joint 257b for accommodating the drill bit 55. During drilling operations, the housing, and thus the drill bit 55, rotate when the drill pipe is rotated by the rotary table at the surface. The lower end 258 of the housing 256 has reduced outer dimensions 258 and bore 259 therethrough. The reduced-dimensioned end 258 has a shaft 260 that is connected to the lower end 257b and a passage 26 for allowing the drilling fluid to pass to the drill bit 55. A non-rotating sleeve 262 is disposed on the outside of the reduced dimensioned end 258, in that when the housing 256 is rotated to rotate the drill bit 55, the non-rotating sleeve 262 remains in its position. A plurality of independently adjustable or expandable pads 264 are disposed on the outside of the non-rotating sleeve 262. Each pad 264 is preferably hydraulically operated by a control unit in the drilling assembly 256. A plurality of formation sensors is located on each of the pads 264. Those versed in the art would also recognize that these pads, because they are provided with the ability for selectively extending or retracting during drilling operations, can also be used as stabilizers and for controlling the drilling direction. Mechanisms for extending the pads to make contact could be operated by hydraulic, mechanical or electrical devices. A commonly used mechanical arrangement is to have the pads mounted on springs that keep the pads in contact with the borehole wall. Such devices would be familiar to those versed in the art. Alternatively, the drilling assembly could be provided with separate stabilizer and steering assemblies. The arrangement of the formation sensors is discussed below in reference to FIGS. 3A–3F.

The drilling assembly also includes a directional sensor 271 near the upper end 257a and sensors for determining the temperature, pressure, fluid flow rate, weight on bit, rotational speed of the drill bit, radial and axial vibrations, shock and whirl. Without limiting the scope of the invention, the directional sensors 271 could be of the magnetic or inertial type. The drilling assembly 255 preferably includes a number of non-magnetic stabilizers 276 near the upper end 257a for providing lateral or radial stability to the drill string during drilling operations. A flexible joint 278 is disposed between the section 280 and the section containing the non-rotating sleeve 262. A control unit designate by 284 includes a control circuit or circuits having one or more processors. The processing of signals is performed generally in the manner described below in reference to FIGS. 5A–5B. A telemetry device, in the form of an electromagnetic device, an acoustic devise, a mud-pulse device or any other suitable device, generally designated herein by 286 is disposed in the drilling assembly at a suitable place. A microprocessor 272 is also disposed in the drilling assembly at a suitable location.

Figure 3A:
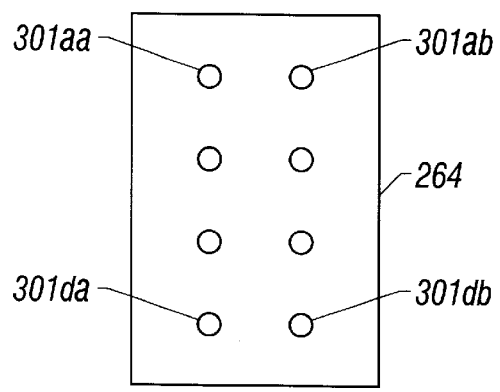
FIG. 3A illustrates the arrangement of resistivity sensors on a pad.

FIG. 3A illustrates the arrangement of a plurality of resistivity sensors on a single pad 264. The electrodes are arranged in a plurality of rows and columns: in FIG. 3A, two columns and four rows are shown, with the electrodes identified from 301aa to 301db. In a typical arrangement, the buttons would be an inch apart. Having a plurality of columns increases the azimuthal resolution of resistivity measurements while having a plurality of rows increases the vertical resolution of resistivity measurements.

Figure 3B:
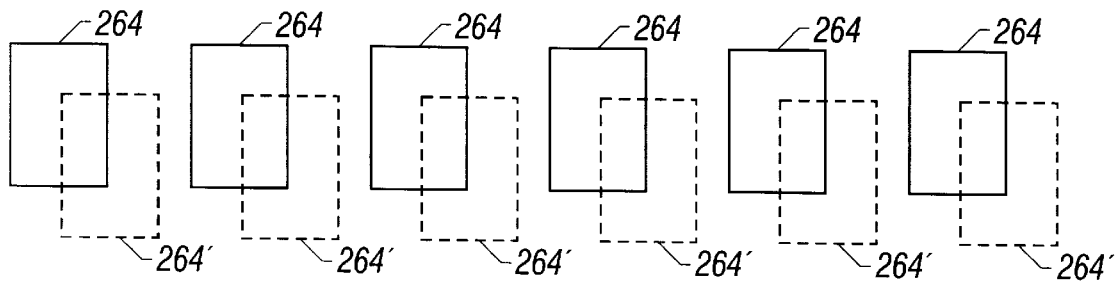
FIG. 3B illustrates the overlap between pads on a rotating sensor arrangement.

FIG. 3B illustrates how a plurality of pads, six in this case, can provide resistivity measurements around the borehole. In the figure, the six pads are shown as 264 at a particular depth of the drilling assembly. For illustrative purposes, the borehole wall has been "unwrapped" with the six pads spread out over 360° of azimuth. As noted above, the pads are on arms that extend outward from the tool body to contact the wall. The gap between the adjacent pads will depend upon the size of the borehole: in a larger borehole, the gap will be larger. As the drilling proceeds, the tool and the pads will move to a different depth and the new position of the pads is indicated by 264'. As can be seen, there is an overlap between the positions of the pads in azimuth and in depth. The tool orientation is determined by the microprocessor 272 from the directional sensors 271. This overlap provides redundant measurements of the resistivity that are processed as described below with reference to FIGS. 5A and 5B.

Those versed in the art would recognize that even with a substantially non-rotating sleeve on the drilling assembly, some rotation of the sleeve will occur. With a typical drilling rate of 60 feet per hour, in one minute, the tool assembly will advance one foot. With a typical rotary speed of 150 rpm, even a sleeve designed to be substantially non rotating could have a complete revolution in that one minute, providing for a complete overlap. Those versed in the art would also recognize that in an alternate disposition of the sensor that rotates with the drill bit, a complete overlap would occur in less than one second.

Figure 3E:
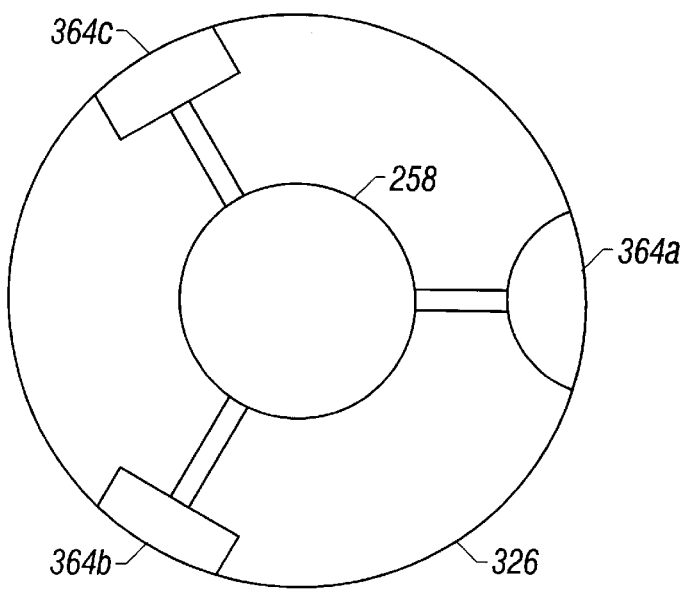
FIG. 3E illustrates the arrangement of density sensors according to the present invention.
Figure 3C:
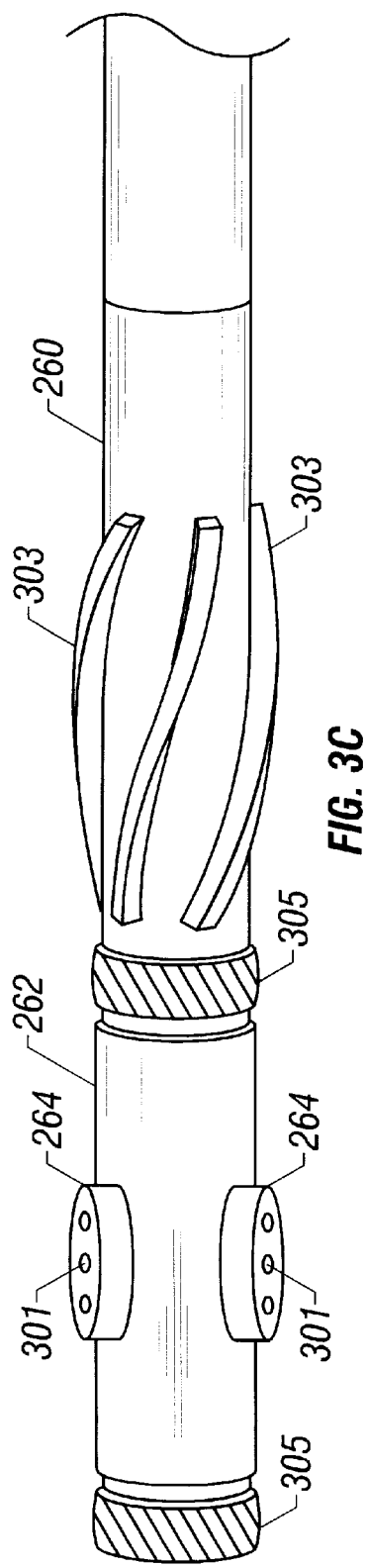
FIG. 3C illustrates the pads on a non-rotating sleeve used for resistivity measurements.

FIG. 3C illustrates the arrangement of the sensor pads in one embodiment of the present invention. Shown are the drilling shaft 260 with the non-rotating sleeve 262 mounted thereon. Pads 264 with sensors 301 are attached to sleeve 262. The mechanism for moving the pads out to contact the borehole, whether it be hydraulic, a spring mechanism or another mechanism is not shown. Two toroids 305 that are wound with a current carrying conductor (not shown) surround the shaft. The toroids are arranged with same polarity, so that upon passage of a current in the toroid, a magnetic circumferential magnetic field is induced in the two toroids. This magnetic field, in turn, induces an electric field along the axis of the shaft. The leakage current measured by the sensors 301 is then a measure of the resistivity of the formation adjacent to the sensors, with the leakage current being substantially radial. Such an arrangement has been used before in wireline logging but has not been attempted before in measurement while drilling applications. The shaft 260 is provided with stabilizer ribs 303 for controlling the direction of drilling.

Figure 3D:
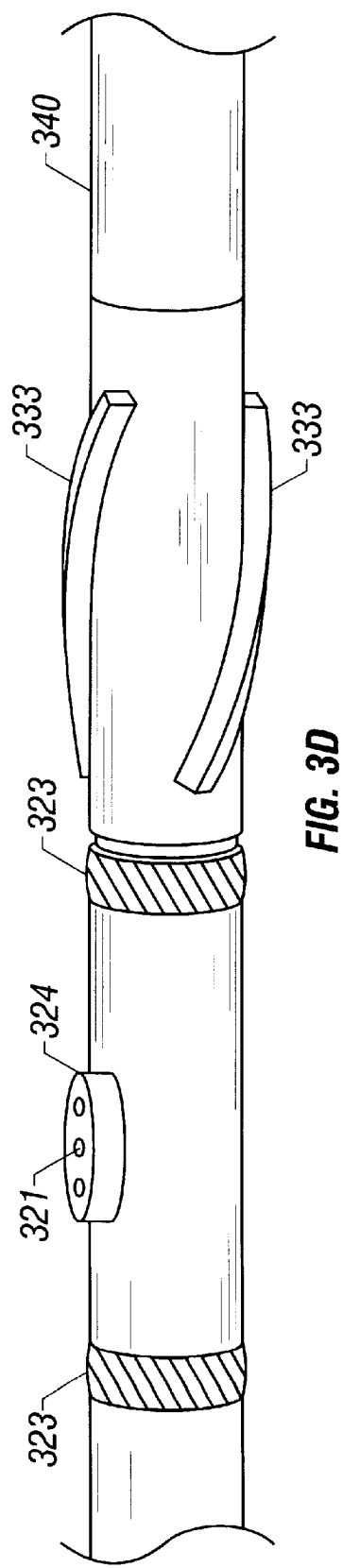
FIG. 3D illustrates the a pad used for resistivity measurements that rotates with the drilling shaft.
Figure 3F:
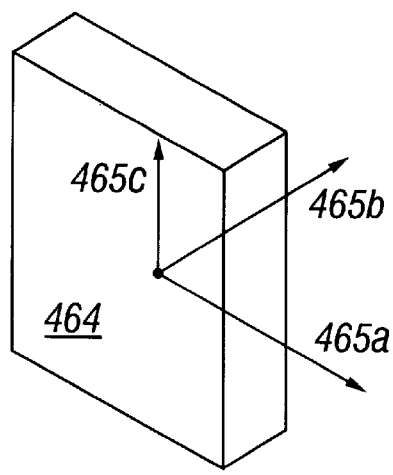
FIG. 3F illustrates the arrangement of elastic transducers on a pad.

In an alternate arrangement shown in FIG. 3D, the pad 324 is coupled to the shaft 340 by the mechanism for engaging the shaft to the borehole (not shown), so that it rotates with the shaft rather than being non-rotating. The stabilizer 333 serves the same function as in FIG. 3C while the current carrying toroids 323 produce an electric field that operates in the same manner as in the discussion above with respect to FIG. 3C.

FIG. 3E illustrates the arrangement of density sensors according to the present invention. Shown is a cross section of the borehole with the wall designated as 326 and the tool generally as 258. The pads engage the walls of the borehole with a radioactive source in pad 364a and receivers on pads 364b and 364c. This arrangement is similar to that used in wireline tools except that in wireline tools, the source is located in the body of the tool.

The pads could also have elastic (commonly referred to as acoustic) transducers mounted on them. In the simplest arrangement shown in FIG. 3F, each pad has a three component transducer (or, equivalently, three single component transducers) mounted thereon. The transducer is adapted to engage the borehole wall and capable of pulsating or vibratory motion in three directions, labeled as 465a, 465b and 465c. Those versed in the art would recognize that each of these excitations generates compressional and shear waves into the formation. Synchronized motion of transducers on the plurality of pads introduces seismic pulses of different polarization into the formation that can be detected at other locations. In the simplest configuration, the detectors are located on the surface (not shown) and can be used for imaging the subsurface formations of the earth. Depending upon the direction of the pulses on the individual pads, compressional and polarized shear waves are preferentially radiated in different directions.

Figure 4:
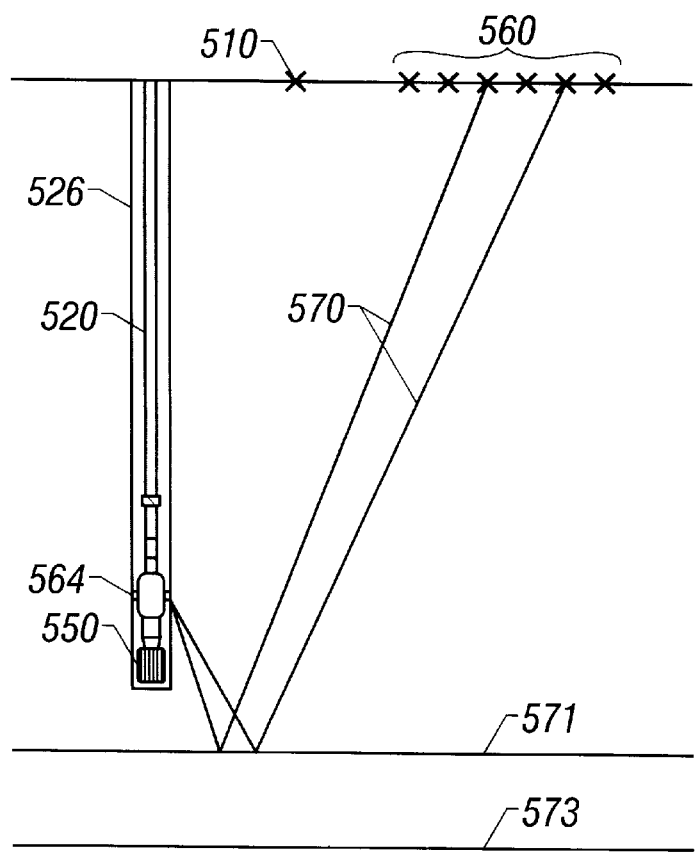
FIG. 4 illustrates the acquisition of a set of reverse VSP data according to the present invention.

FIG. 4 illustrates the acquisition of a set of reverse VSP data according to the present invention. A plurality of seismic detectors 560 are disposed at the surface 510. A borehole 526 drilled by a drill bit 550 at the end of a drillstring 520 is shown. The downhole drilling assembly includes seismic sources 564 on pads that engage the walls of the borehole. Seismic waves 570 radiating from the sources 564 are reflected by boundaries such as 571 and 573 and detected at the surface by the detectors 560. The detection of these at the surface for different depths of the drilling assembly gives what is called a reverse Vertical Seismic Profile (VSP) and is a powerful method of imaging formations ahead of the drill bit. Processing of the data according to known methods gives a seismic image of the subsurface. While reverse VSPs using the drill bit itself as a seismic source have been used in the past, results are generally not satisfactory due to a lack of knowledge of the characteristics of the seismic signal and due to poor S/N ratio. The present invention, in which the source is well characterized and is in essentially the same position on a non-rotating sleeve has the ability to improve the S/N ratio considerably by repeatedly exciting the sources in essentially the same position. Those versed in the seismic art would be familiar with the pattern of energy radiated into the formation by the different directions of motions of the transducers 465 and their arrangement on a circular array of pads.

Those versed in the art would also recognize that instead of seismic pulses, the seismic transmitters could also generate swept-frequency signals that continuously sweep through a selected range of frequencies. The signals recorded at the transmitters can be correlated with the swept frequency signal using well known techniques to produce a response equivalent to that of an impulsive seismic source. Such an arrangement requires less power for the transmitters and is intended to be within the scope of the invention.

The VSP configuration could be reversed to that of a conventional VSP, so that downhole sensors on a non-rotating sleeve measure seismic signals from a plurality of surface source positions. Such an arrangement would suffer from the disadvantage that a considerably greater amount of data would have to be transmitted uphole by telemetry.

In an alternate arrangement (not shown), two sets of axially spaced-apart pads are provided on the non-rotating sleeve. The second set of pads is not illustrated but it has an arrangement of detectors that measure three components of motion similar to the excitation produced by the sources 465. Those versed in the art would recognize that this gives the ability to measure compressional and shear velocities of the formation between the source and the receiver. In particular, because of the ability to directly couple a seismic source to the borehole wall, shear waves of different polarization can be generated and detected. Those versed in the art would know that in an anisotropic formation, two different shear waves with different polarization and velocity can be propagated (called the fast and the slow shear wave). Measurement of the fast and slow shear velocities gives information about fracturing of the formation and would be familiar to those versed in methods of processing the data to obtain this fracturing information.

The same arrangement of having seismic transmitters and receivers on non-rotating pads in the drilling assembly makes it possible to record reflections from surfaces in the vicinity of the borehole. In particular, it enables the device to obtain distances to seismic reflectors in the vicinity of the borehole. This information is useful in looking ahead of the drillbit and in guiding the drillbit where it is desired to follow a particular geologic formation.

Those versed in the art would recognize that by having an arrangement with four electrodes substantially in a linear arrangement on a number of non-rotating pads, the outer electrodes being a transmitter and a receiver respectively, and by measuring the potential difference between the inner electrodes, a resistivity measurement of the formation can be obtained. Such an arrangement is considered to be conventional in wireline logging applications but has hitherto not been used in measurement-while-drilling applications because of the difficulty in aligning the electrodes on a rotating drillstring.

The formation sensor assembly discussed above with respect to FIG. 2 is located on a non-rotating sleeve that is part of a drilling assembly which includes a downhole mud motor. Those versed in the art would recognize that an equivalent arrangement can be implemented wherein instead of a drillstring, coiled tubing is used. This arrangement is intended to be within the scope of the present invention.

In an alternate embodiment of the invention, the formation sensor assembly could be directly mounted on the rotating drillstring without detracting from its effectiveness. This was discussed above with respect to resistivity sensors in FIG. 3D.

Figure 5A:
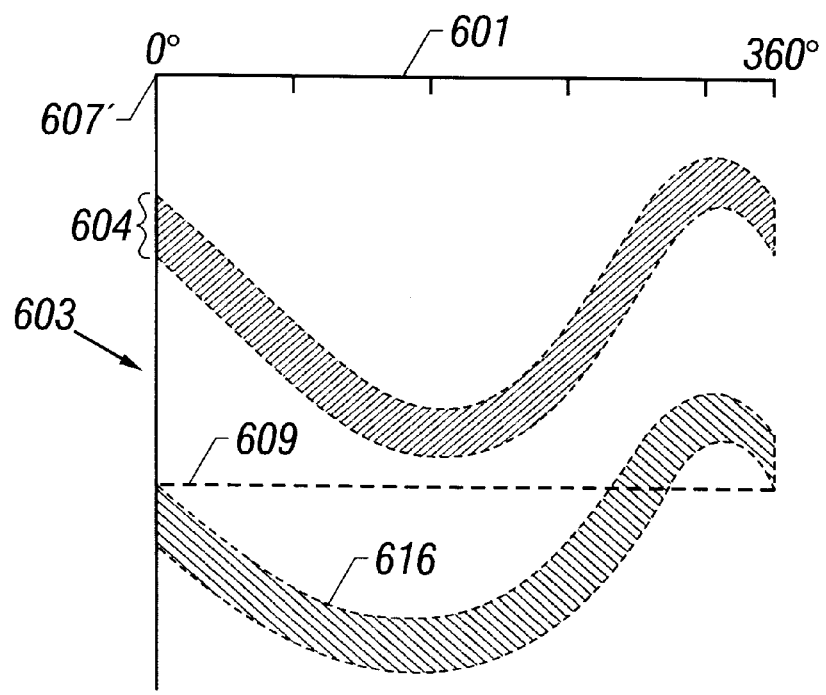
FIGS. 5A–5B show a method by which depth is calculated downhole.
Figure 5B:
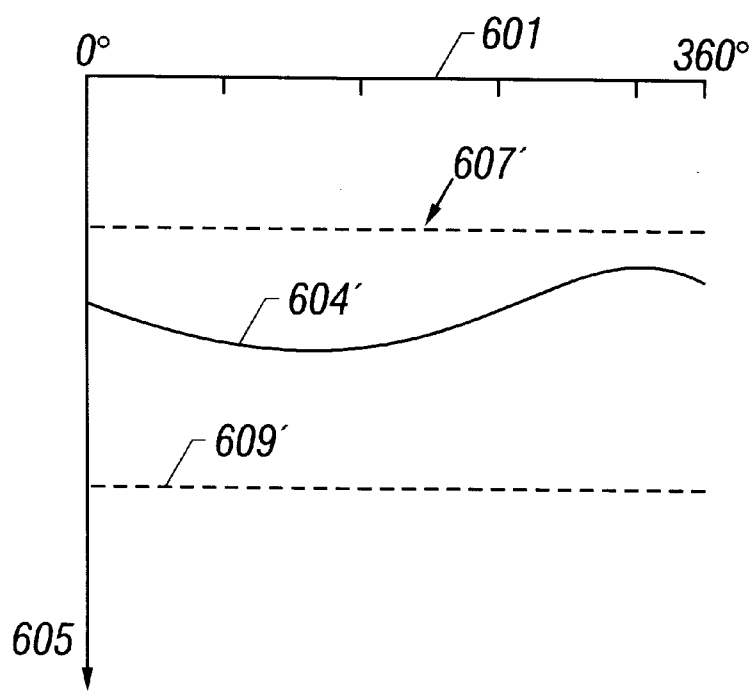

The method of processing of the acquired data from any one of these arrangements of formation sensors is discussed with reference to FIGS. 5A–5B. For illustrative purposes, FIG. 5A illustrates the "unwrapped" resistivity data that might be recorded by a first resistivity sensor rotating in a vertical borehole as the well is being drilled. The horizontal axis 601 has values from 0° to 360° corresponding to azimuthal angles from a reference direction determined by the directional sensor 271. The vertical axis 603 is the time of measurement. As the resistivity sensor rotates in the borehole while it is moved along with the drill bit, it traces out a spiral path. Indicated in FIG. 5A is a sinusoidal band 604 corresponding to, say, a bed of high resistivity intersecting the borehole at a dipping angle.

In one embodiment of the invention, the downhole processor 272 uses the depth information from downhole telemetry available to the telemetry device 286 and sums all the data within a specified depth and azimuth sampling interval to improve the S/N ratio and to reduce the amount of data to be stored. A typical depth sampling interval would be one inch and a typical azimuthal sampling interval is 15°. Another method of reducing the amount of data stored would be to discard redundant samples within the depth and azimuth sampling interval. Those versed in the art would recognize that a 2-D filtering of the data set by known techniques could be carried out prior to the data reduction. The data after this reduction step is displayed on a depth scale in FIG. 5B where the vertical axis 605 is now depth and the horizontal axis 601 is still the azimuthal angle with respect to a reference direction. The dipping resistive bed position is indicated by the sinusoid 604'. Such a depth image can be obtained from a time image if at times such as 607 and 609, the absolute depth of the resistivity sensor, 607' and 609' were known.

As a backup or as a substitute for communicating depth information downhole, the microprocessor uses data from the additional resistivity sensors on the pads to determine a rate of penetration during the drilling. This is illustrated in FIG. 5A by a second resistivity band 616 corresponding to the same dipping band 604 as measured at a second resistivity sensor directly above the first resistivity sensor. The spacing between the first and second resistivity sensors being known, a rate of penetration is computed by the microprocessor by measuring the time shift between the bands 604 and 616. The time shift between the bands 604 and 606 could be determined by one of many methods, including cross-correlation techniques. This knowledge of the rate of penetration serves as a check on the depth information communicated downhole and, in the absence of the downhole telemetry data, can be used by itself to calculate the depth of the sensors.

The method of processing discussed above works equally well for resistivity measurements made by sensors on a non-rotating sleeve. As noted above with reference to FIG. 3B, there is still a slow rotation of the sensors that provides redundancy that can be utilized by the processor 272 as part of its processing-before-transmission.

Figure 6A:
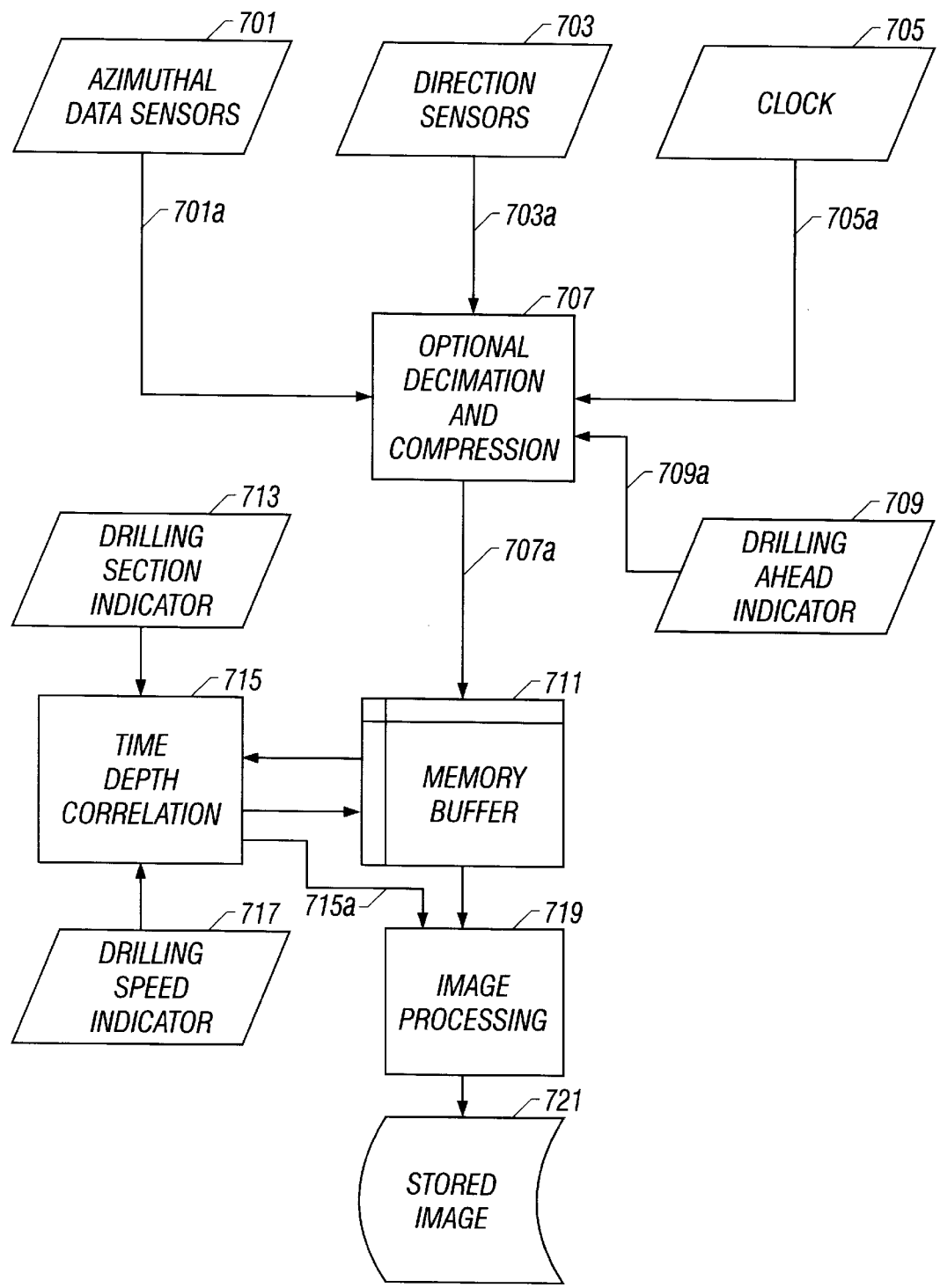
FIGS. 6A and 6B are schematic illustrations of the sequence of data flow in processing the data.

FIG. 6A illustrates the flow of data in one embodiment of the invention. The plurality of azimuthal data sensors (301 in FIG. 3A) are depicted at 701. The output 701a of the azimuthal data sensors 701 is azimuthal sensor data as a function of time. The direction sensors (271 in FIG. 2) are denoted at 703. The output 703a of the direction sensors 703 is the azimuth of the drilling assembly as a function of time. Using timing information 705a from a clock 705 and the information 709a from the drilling ahead indicator 709, the processor first carries out an optional data decimation and compression step at 707. The drilling ahead indicator uses a plurality of measurements to estimate the rate of advance of the drill bit. A sensor for measuring the weight on the drill bit gives measurements indicative of the rate of penetration: if the weight on the drill bit is zero, then the rate of penetration is also zero. Similarly, if the mud flow indicator indicates no flow of the mud, then too the drill bit is not advancing. Vibration sensors on the drill bit also give signals indicative of the forward movement of the drill bit. A zero value for weight on the drill bit, mud flow or drill bit vibration means that the sensor assembly is at a constant depth.

This step of data decimation and compression may stack data from multiple rotations of the sensor assembly that fall within a predetermined resolution required in the imaging of the data. This information 707a consisting of data as a function of azimuth and depth is stored in a memory buffer 711. A memory buffer with 16 MByte size is used, adequate to store the data acquired using one segment of drill pipe. As would be known to those versed in the art, the drill pipe comes in segments of 30 feet, successive segments being added at the wellhead as drilling progresses.

Using estimates of the drilling speed from 717, and a drilling section completed indicator 713 a depth-time correlation is performed 715. The drilling section completed indicator includes such information as the number of drill string segments. The drilling rate estimate is obtained, e.g., from the method given in the discussion of FIGS. 5A and 5B above. The time-depth transformation function 715a obtained by this is used at 719 to process the data as a function of azimuth and time in the memory buffer 711 to give an image that is a function of azimuth and depth. This image is stored downhole at 721 in a memory buffer. With 16 Mbytes of memory, it is possible to store 1700 feet of data downhole with a 1 inch resolution. This data is later retrieved when tripping the well or could be transmitted uphole using the telemetry device 286. By processing the data downhole in this fashion, the demand on the telemetry device is greatly reduced and it can be used for transmitting other data relating to the drilling motor and the drill bit uphole.

The memory requirement for storing the data are easily computed. For example, for an 8½" hole, storage of one foot of data with a resolution of 1"×1" requires $(12) \times (\pi \times 8.5) \times 4 = 1282$ data points. (Those versed in the art would recognize the factor of 4 as arising from having to satisfy the Nyquist sampling criterion in two dimensions). For 5000 ft. of data and 16 bits (2 bytes) per data sample, this gives a total of 12.82 MBytes. This is a reasonable size for a memory with presently available hardware and can, of course, be increased in the future as memory devices become more compact.

Where the depth data is not available downhole, the situation is changed due to the variability of the drilling rate. The system must be able to collect data at a fast drilling rate of 200 ft./hr. as well as at a slow drilling rate of 20 ft./hr., a factor of 10 variability. Systems that do not know the drilling rate will need to store data to accommodate the fastest drilling rate (200 ft./hr. in this example). If the hole is actually drilled at 20 ft/hr, then the amount of data that would have to be stored downhole in the absence of any processing and decimation becomes ten times as large: 130 Mbytes in the present example. This amount of data storage is at present impractical with available hardware.

Figure 6B:
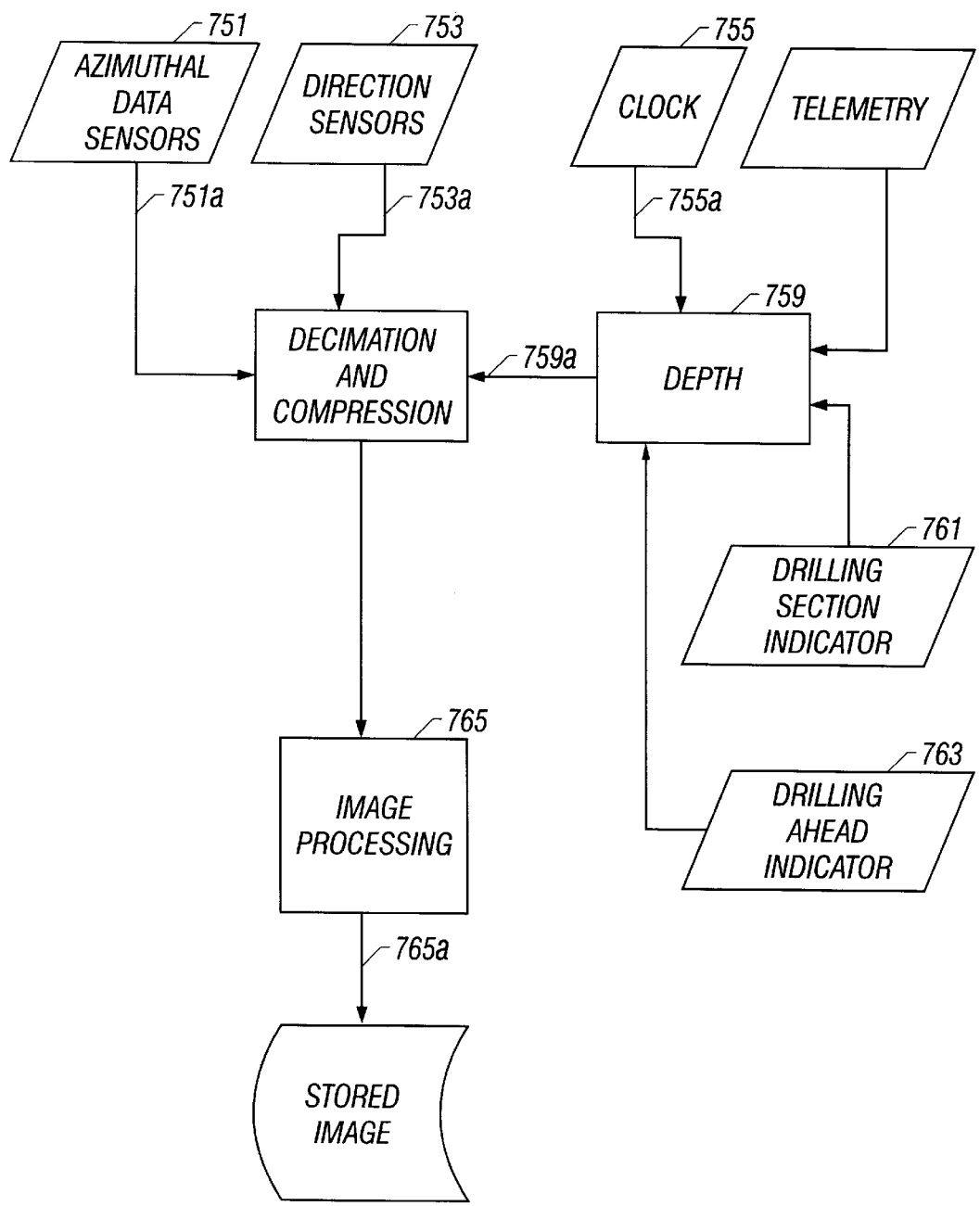

The arrangement shown in FIG. 6A does not use any telemetry data from the surface to compute depth. In an alternate arrangement shown in FIG. 6B, a depth calculation is performed downhole at 759 to give an actual position of the sensor assembly using information from a number of sources including telemetry data. One is the timing information 755a from the clock 755. A drilling speed sensor gives an indication of the drilling speed. Drilling speed 756a is obtained from one of two sources 756. In one embodiment, a downhole inertial sensor (not shown) is initialized each time that drilling is stopped for adding a section of drill pipe. The information from this inertial sensor provides an indication of drilling speed. In addition, or as an alternative, drilling speed transmitted from the surface by the downlink telemetry could be used and received at the downhole telemetry device 286 is used.

An indicator of the drilling section completed 761, as discussed above with reference to 713 in FIG. 6A is used as an additional input for the depth calculations, as is an estimate from the drilling ahead indicator 763, discussed above with reference to 709 in FIG. 6A. This depth calculation 759a is used in data compression and decimation 757 (as discussed above with reference to FIG. 6A) to process data 751a from the azimuthal measurement sensors 751 and the data 753a orientation sensors 753. The image processing at 765 gives the image data as a function of depth 765a, this data being stored downhole 767 with the same resolution as at 721 in FIG. 6A. The processing scheme of FIG. 6B does not require the memory buffer 711 that is present in FIG. 6A; however, it does require more depth data to be transmitted downhole, thus tying up the telemetry link to some extent.

As noted above in the discussion of FIGS. 5A–5B, a combination of both methods could also be used, i.e. perform depth calculations from sensor data downhole in addition to using downlinked data.

The discussion above was with respect to resistivity measurements. Any other scalar measurement made by a sensor can be treated in the same fashion to improve the S/N ratio prior to transmitting it uphole by telemetry. Vector data, such as acquired by compressional and shear wave transducers requires somewhat more complicated processing that would be known to those versed in the art.

As mentioned above, the data transmitted from downhole is indicative of resistivities at uniformly sampled depths of layers of the formation. The data is transmitted in real time. The processes and apparatus described above provide a relatively high resolution color image of the formation in real-time. The resolution of this image may be enhanced even further by using various image enhancement algorithms. These image enhancing algorithms would be familiar to those versed in the art.

Figure 7A:
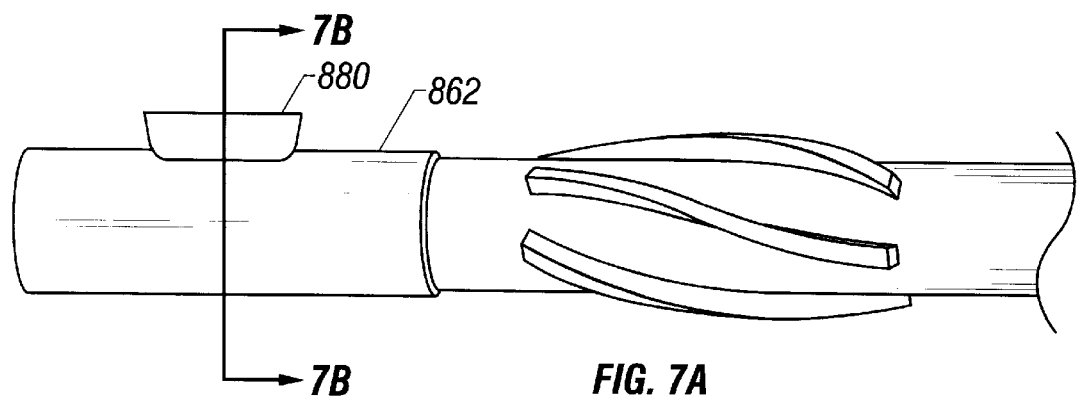
FIGS. 7A–7D are schematic illustrations of the invention in which NMR measurements are made using pad mounted sensors.

The basic sensor configuration of FIG. 3C is also used in another embodiment of the invention to make Nuclear Magnetic Resonance (NMR)measurements. This is illustrated schematically in FIGS. 7A and 7B. The sleeve 862 is provided with at least one pad 880 that makes contact with the borehole wall. Included in the pad is a permanent magnet assembly 883 denoted here by individual magnets 883a, 883b and 883c. In a preferred embodiment, the two magnets on the sides are oriented with like poles in the same direction and the magnet in the middle is oriented with its poles opposite to the poles of the side magnets. With the arrangement of magnets shown, a static magnetic field is produced within the formation adjacent to the pad 280. As would be known to those versed in the art, there is a region, known as the region of examination, within which the field strength is substantially constant and the field direction is radial.

Figure 7B:
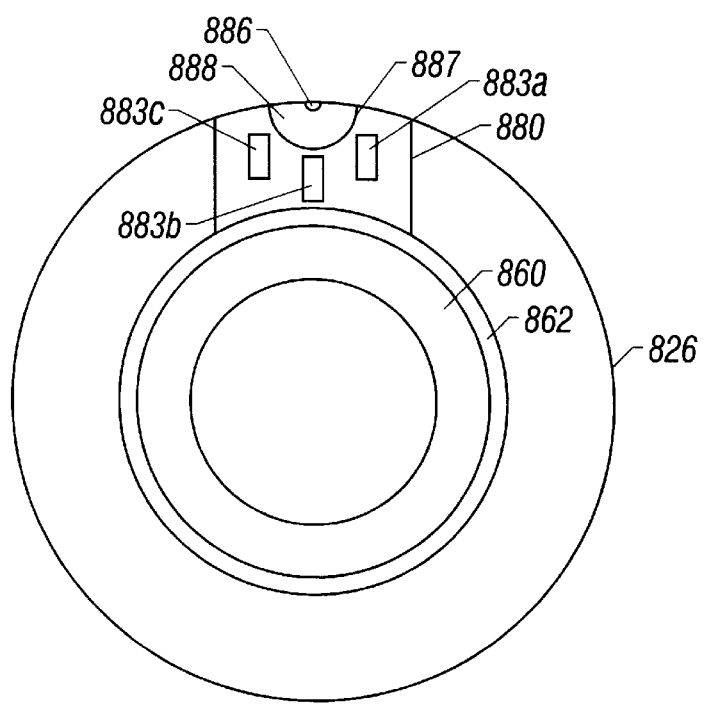

NMR measurements are made by inducing a Radio Frequency (RF) field in the formation that has a direction that is orthogonal to the static magnetic field and making measurements of the relaxation of the spin induced by the RF field. FIG. 7B shows one arrangement in which a conductor 886 is arranged in an axial direction in the pad 880 with a conducting sheath 888 and soft ferrite 887. By pulsing an RF current through the conductor 886 with a return path through the sheath 888, an RF magnetic field is induced in the formation with a substantially tangential field direction, i.e., circumferential with respect to the axis of the borehole. This is orthogonal to the static field in the region of examination. The transmitter is turned off and the arrangement is used to measure the RF field produced by the relaxation of the spin induced by the RF field within the formation.

Figure 7C:
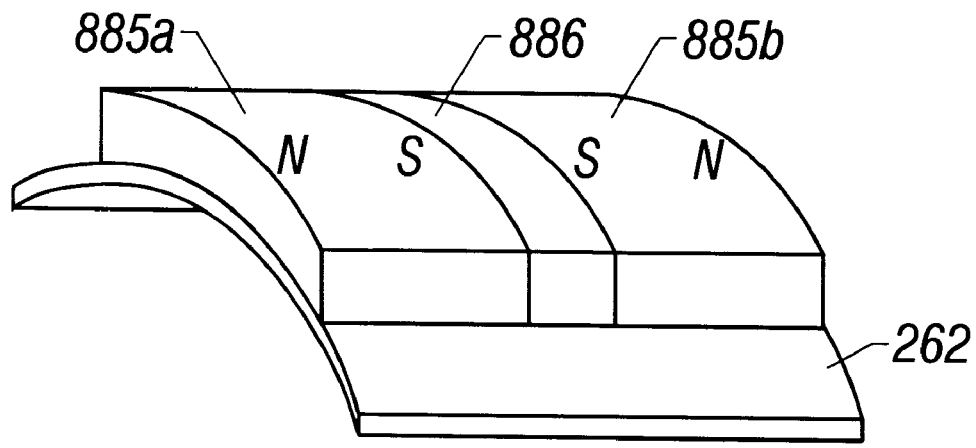

An alternate arrangement of the permanent magnets is illustrated in perspective view in FIG. 7C. A pair of permanent magnets 785a and 785b in the shape of arcuate segments of cylinders are disposed in an axial direction with the direction of magnetization of the two magnets in opposite directions. This, or similar arrangements comprising more than one pair of magnets, produces a region of examination in the formation with a substantially uniform field strength having a radial field direction. Inclusion of a ferrite element 786 between the magnets helps in shaping the region of examination. The RF coil arrangement of FIG. 7B is used to produce an RF field with a tangential component within the region of examination.

Figure 7D:
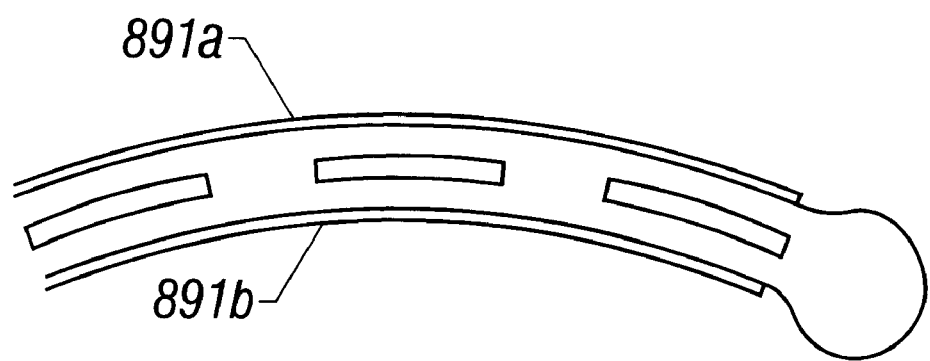

FIG. 7D illustrates an alternate RF antenna arrangement that can be used with the permanent magnet arrangements of FIG. 7B or FIG. 7C. Sheet conductors 791a and 791b are arranged in arcuate portions of the pad (not shown). When the antenna is pulsed with an RF signal, an RF magnetic field with a substantially longitudinal component is produced within the formation adjacent the pad. This field is orthogonal to the radial static field produced by the permanent magnet arrangements of FIG. 7B or FIG. 7C.

Those versed in the art would recognize that by using a single magnet (instead of a pair of opposed magnets) in the configuration of FIG. 7C, a static field that is substantially longitudinal is produced in the formation in the vicinity of the borehole. The RF antenna arrangement shown in FIG. 7B that produces an RF field in the formation having a substantially tangential component (circumferential with respect to the longitudinal axis) and could be used to make NMR measurements because of its orthogonality to the static field. Alternatively, a circular RF coil with its axis in a radial direction (not shown) with respect to the borehole axis can be used to produce a radial RF field that is orthogonal to the longitudinal static field to make NMR measurements.

Those versed in the art would also recognize that with any of the configurations discussed with reference to FIGS. 7A–7D, using a plurality of pads oriented in different directions, or by making measurements with a single pad at different azimuths, azimuthal variations in the NMR properties of the formation can be determined. Such an azimuthal variation could be caused by fractures in the formation that are aligned with fracture planes parallel to the axis of the borehole, so that the amount of fluid in the formation (which is what determines the NMR response) has an azimuthal variation. The azimuthal variations could also be measured on a single pad that is rotating sufficiently slowly that the region of examination does not change significantly during the time that the NMR measurements are made.

Figure 8:
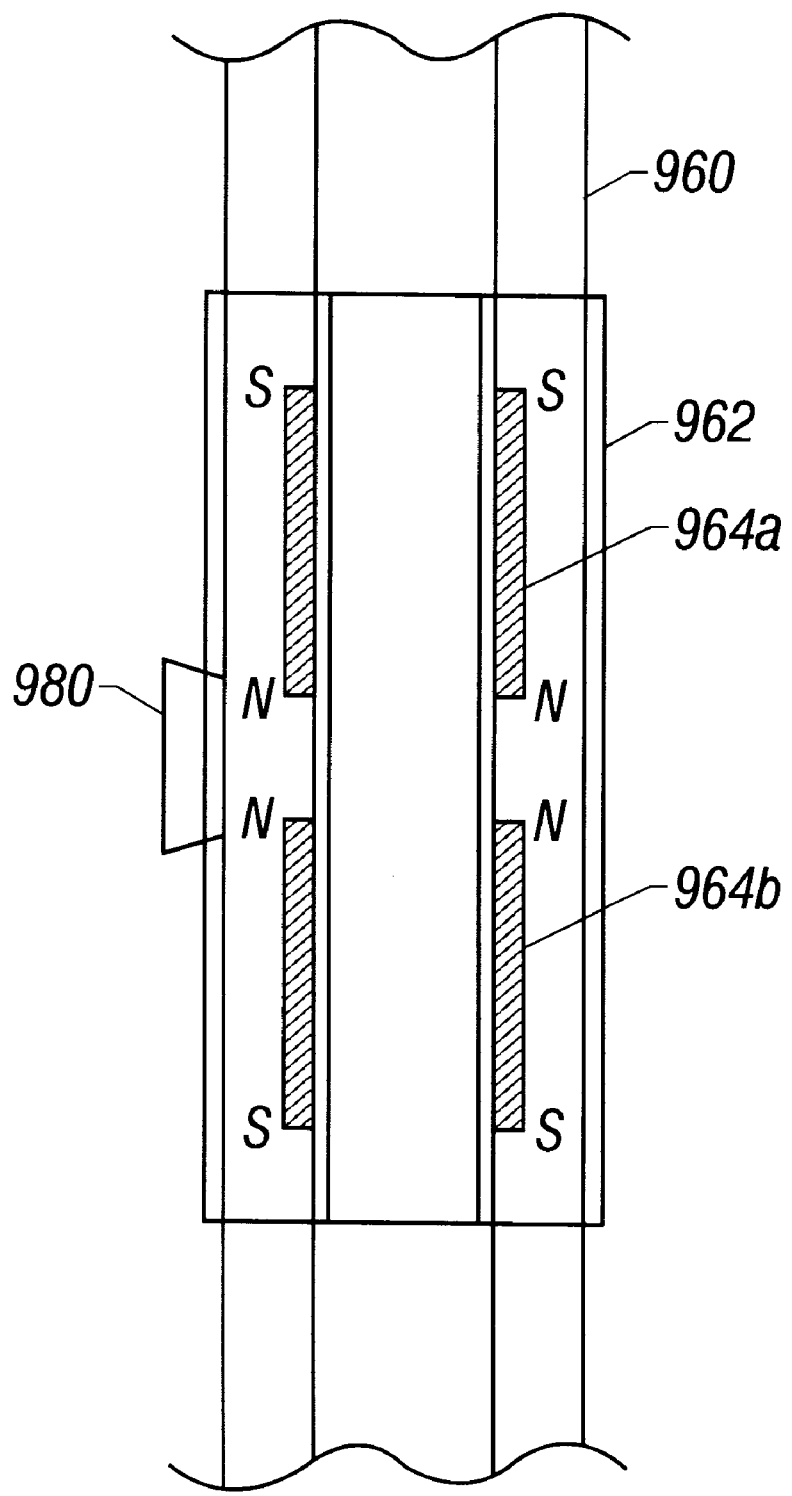
FIG. 8 illustrates an arrangement of permanent magnets on the housing according to one aspect of this invention.

In yet another embodiment of the invention shown in FIG. 8, the permanent magnet assembly is mounted on the rotating housing 960. The RF transmitter/receiver assembly is included in at least one sensor module 980 that is mounted on a substantially non-rotating sleeve 962. The permanent magnet assembly includes a pair of annular cylindrical magnets 964a,b that are longitudinally polarized. Such an arrangement produces a static magnetic field in the formation that is radial in direction and rotationally symmetric around the borehole, so that rotation of the magnet assembly itself would not affect the measurements (except for effects caused by vibration of the magnet assembly). The measurements made by the RF assembly would be azimuthally dependent if there is any azimuthal variation in the formation.

Figure 9A:
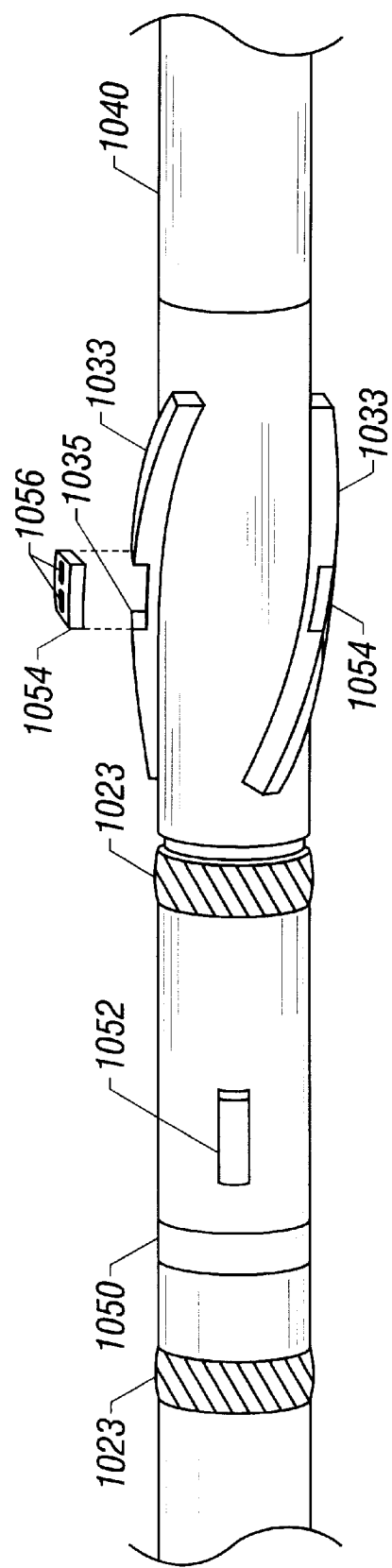
FIGS. 9A–9C are schematic illustrations of the invention in which electromagnetic induction measurements are made at various azimuths.

FIG. 9a shows an embodiment of the invention in which electromagnetic induction sensors are used to determine the resistivity of the formation. An electromagnetic transmitter antenna 1050 is used to induce an electromagnetic signal into the formation. Each of the stabilizers 1023 is provided with a recess 1035 into which an electromagnetic receiver module 1054 is set. Each electromagnetic receiver module 1054 has a plurality of slots 1056 behind which the receiver coils (not shown) are set, The slots are axially spaced apart so that measurements may be made at at least two transmitter to receiver distances. The antenna 1050 is controlled by an electronics module 1052 at a suitable location. Using known electromagnetic induction logging methods, the transmitter sends out a pulse at a frequency and the amplitude and phase of the signal received by the receivers in the receiver modules is used to determine the resistivity of the formation. The frequency of the transmitted signal is typically between 1 MHz and 10 MHz. With the azimuthally disposed arrangement of the stabilizers 1033 and the receiver modules 1054 on the stabilizers, this embodiment makes it possible to determine an azimuthal variation of resistivity. When multiple frequency signals are used, both the resistivity and the dielectric constant of the formation may be determined using known methods.

Figure 9B:
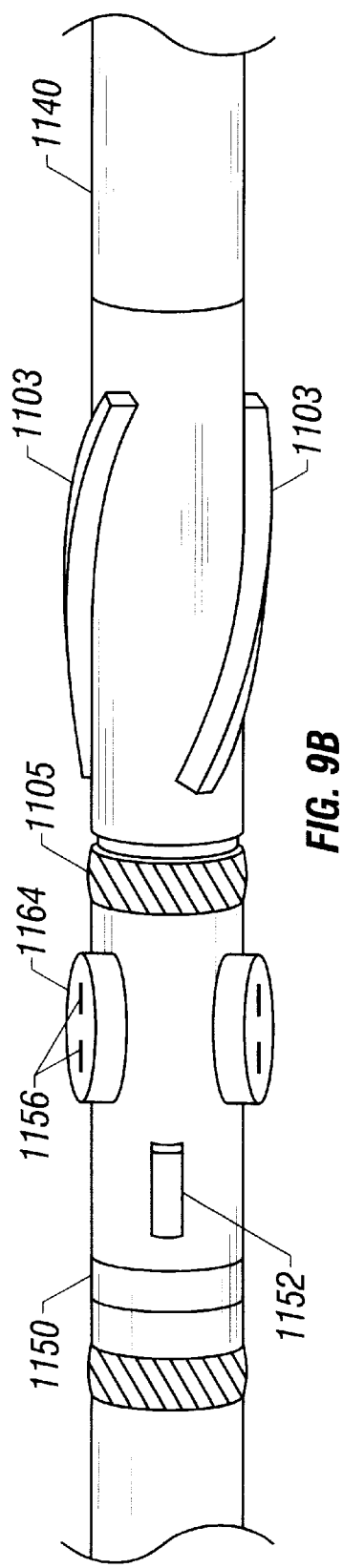

The embodiment shown in FIG. 9b has the electromagnetic receivers in a pad-mounted configuration. In an arrangement similar to that of FIG. 3C, the pads 1164 are mounted on a sleeve 1105. The pads may be extended to make contact with the formation using hydraulic, electrical or mechanical arrangements (not shown). The transmitter 1150 is also mounted on the sleeve. The electronics control for the transmitter and the receiver may be mounted at a suitable location 1152. As with the embodiment disclosed in FIG. 9a, azimuthal variations of electrical properties may be determined by amplitude and phase measurements of the received signal following excitation of the transmitter 1150.

Figure 9C:
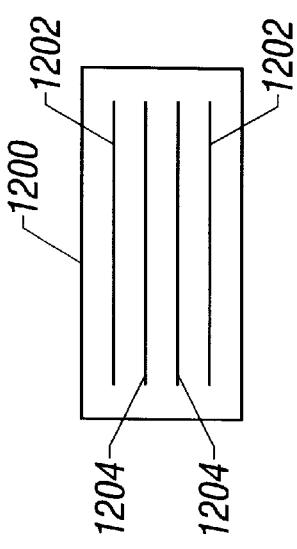

FIG. 9c shows transmitter-receiver module 1200 suitable for use for higher frequency induction logging with a signal at 1 GHz or more. This module may be mounted in the recess 1035 of a stabilizer 1033, as shown in FIG. 9a or on a pad, such as 1164 in FIG. 9b. The module is provided with at least two transmitter slots 1202 and receiver slots 1204 with the respective transmitter and receiver coils (not shown) behind the slots. The transmitters are preferably disposed symmetrically about the receivers. The transmitter to receiver distances in this module are considerably less than in the embodiments discloses in FIGS. 9a, 9b necessitating the use of high frequency signals (1 GHz or more).

In another embodiment of the invention, induction measurements are obtained using the electrode arrangement of FIG. 3A. For example, referring to FIG. 3A, the electrodes 301aa, 301ab could be used as a transmitter when pulsed simultaneously, as could the electrodes 301da, 301db. Similarly, the electrodes 301ba, 301bb constitute one receiver while the electrodes 301ca, 301cb constitute a second receiver.

The foregoing description has been limited to specific embodiments of this invention. It will be apparent, however, that variations and modifications may be made to the disclosed embodiments, with the attainment of some or all of the advantages of the invention. In particular, the invention may be modified to make density and acoustic measurements. Therefore, it is the object of the appended claims to cover all such variations and modifications as come within the true spirit and scope of the invention.

What is claimed is:

1. A Measurement-while-Drilling (MWD) apparatus mounted on a drilling assembly for determining a parameter of interest of a formation surrounding a borehole having a longitudinal axis, said apparatus comprising:

(a) a rotatable housing;

(b) at least one substantially non-rotating member on the outside of the housing; and (c) at least one substantially non-rotating pad having a formation evaluation sensor thereon for making a measurement relating to the parameter of interest of the formation, said at least one pad operatively coupled to the non-rotating member and adapted to make contact with the formation.

2. The apparatus of claim 1 further comprising a processor disposed in the housing, the processor using directional information form a directional sensor in the housing and the measurement from the formation evaluation sensor on the at least one pad to determine the parameter of interest.

3. The apparatus of claim 1 wherein the drilling assembly is conveyed on a drilling tubular selected from: (i) a drillstring, and (ii) coiled tubing.

4. The MWD apparatus of claim 1 further comprising an extension device for moving the at least one pad from a retracted position to an extended position wherein the pad makes contact with the formation, said device selected from the group consisting of: (i) hydraulically operated, (ii) spring operated, and (iii) electrically operated.

5. The apparatus of claim 1 wherein the parameter of interest is selected from the set consisting of: (i) resistivity of the formation, (ii) density of the formation, (iii) compressional wave velocity of the formation, (iv) fast shear wave velocity of the formation, (v) slow shear wave velocity of the formation, (vi) dip of the formation, (vii) radioactivity of the formation, (viii) NMR properties of the formation, and (ix) dielectric property of the formation.

6. The apparatus of claim 1 wherein the parameter of interest is a resistivity image of the borehole.

7. The apparatus of claim 1 wherein the formation evaluation sensor is a Nuclear Magnetic Resonance (NMR) sensor and the parameter of interest is an NMR property of the formation.

8. The apparatus of claim 7 wherein the NMR sensor further comprises:
(i) at least one permanent magnet for producing a first magnetic field having a region of substantially uniform strength in the formation;
(ii) a transmitter located on the at least one non-rotating pad for transmitting a radio frequency pulse into said region of substantially uniform magnetic field to produce a second magnetic field and excite nuclei therein; and
(iii) a receiver located on the at least one non-rotating pad for receiving nuclear magnetic resonance signals from said nuclei in said region of homogenous magnetic field.

9. The apparatus of claim 8 wherein the at least one permanent magnet further comprises an inner magnet with magnetization perpendicular to the axis and two outer magnets symmetrically disposed about the inner magnet, the two outer magnets having magnetization opposite to the magnetization of the inner magnet.

10. The apparatus of claim 8 wherein the at least one permanent magnet further comprises two arcuate magnets having magnetization in opposite directions and parallel to said axis.

11. The apparatus of claim 1 further comprising a transmitter antenna for transmitting an electromagnetic signal having at least one frequency into the formation, and wherein the formation evaluation sensor further comprises two axially spaced apart electromagnetic receiver antennas.

12. The apparatus of claim 1 wherein the formation evaluation sensor further comprises two electromagnetic transmitter antennas for inducing an electromagnetic signal in the formation and two electromagnetic receiver antennas for detecting the induced electromagnetic signal, the two transmitters symmetrically disposed about the two receivers.

13. A Measurement-while-Drilling (MWD) apparatus mounted on a drilling assembly for determining a parameter of interest of a formation surrounding a borehole, said apparatus comprising:
(a) a rotatable housing;
(b) a directional sensor disposed in the housing for making measurements related to the orientation of the housing;
(c) a telemetry device disposed in the housing, said telemetry device adapted to receive depth information from an uphole controller;
(d) at least one substantially non-rotating formation evaluation sensor operatively coupled to the housing and on the outside thereof, said at least one formation evaluation sensor in contact with the formation to make measurements related to the parameter of interest;
(e) a processor for determining the parameter of interest from the measurements made by the directional sensor, the depth information and the measurements made by the at least one formation evaluation sensor.

14. The apparatus of claim 13 wherein the telemetry device is further adapted to transmit the determined parameter of interest to the uphole controller.

15. The apparatus of claim 13 wherein the drilling assembly is conveyed on a drilling tubular selected from: (i) a drillstring, and (ii) a coiled tubing.

16. The MWD apparatus of claim 13 further comprising a substantially non-rotating sleeve coupled to the housing, and wherein the at least one formation evaluation sensor is carried by the sleeve.

17. The apparatus of claim 13 further comprising a pad carrying the at least one formation evaluation sensor.

18. The apparatus of claim 13 further comprising an extension device for moving the pad from a retracted position to an extended position wherein the pad makes contact with the formation, said device selected from the group consisting of: (i) hydraulically operated, (ii) spring operated, and (iii) electrically operated.

19. The apparatus of claim 13 wherein the parameter of interest is selected from the set consisting of: (i) resistivity of the formation, (ii) density of the formation, (iii) compressional wave velocity of the formation, (iv) fast shear wave velocity of the formation, (v) slow shear wave velocity of the formation, (vi) dip of the formation, and (vii) radioactivity of the formation, and (viii) resistivity image of the borehole.

20. The apparatus of claim 13 further comprising at least one stabilizer coupled to the housing for stabilizing the apparatus during drilling operations, and wherein the at least one formation evaluation sensor is coupled to the at least one stabilizer.

21. The apparatus of claim 20 further comprising a transmitter antenna for inducing an electromagnetic signal having a frequency into the formation, and wherein the at least one formation evaluation sensor further comprises two axially spaced apart receiver antennas for receiving the signal induced in the formation by the transmitter.

22. The MWD apparatus of claim 13 wherein the at least one formation evaluation sensor further comprises two spaced apart electromagnetic transmitter antennas on a pad for transmitting an electromagnetic signal having a frequency into the formation and two spaced apart receiver antennas on the pad for detecting the electromagnetic signal induced in the formation by said transmitter antennas, the transmitter antennas symmetrically disposed about the receiver antennas.

23. A method of determining a parameter of interest of the formation surrounding a borehole while drilling the borehole, comprising:
(a) conveying in the borehole a drilling assembly including a drillbit for drilling the borehole and a measurement while drilling (MWD) assembly apparatus including a rotatable housing;
(b) making measurements related to a parameter of interest of the formation with a formation evaluation sensor on a substantially non-rotating pad carried on at least one substantially non-rotating member on the outside of the housing; and
(c) processing the measurements from the formation evaluation sensor in a processor on the housing to determine the parameter of interest.

24. The method of claim 23 wherein the processing includes computing a rate of penetration of the drilling tool.

25. The method of claim 23 wherein the parameter of interest is a resistivity image of the borehole.

26. The method of claim 23 wherein the drilling assembly is conveyed on a drilling tubular selected from: (i) a drillstring, and (ii) coiled tubing.

27. The method of claim 23 further comprising operating an extension device for moving the at least one pad from a retracted position to an extended position wherein the pad makes contact with the formation, said device selected from the group consisting of: (i) hydraulically operated, (ii) spring operated, and (iii) electrically operated.

28. The method of claim 23 further comprising operating an extension device for moving the at least one substantially non-rotating pad from a retracted position to an extended position wherein the substantially non-rotating pad makes contact with the formation, said extension device selected from the group consisting of: (i) hydraulically operated, (ii) spring operated, and (iii) electrically operated.

29. The method of claim 23 wherein the sensor further comprises two axially spaced apart electromagnetic receiver antennas, the method further comprising inducing an electromagnetic signal having at least one frequency in the formation using a transmitter antenna, and receiving in said receiver antennas said induced signal.

30. The method of claim 23 wherein making measurements about the parameter of interest further comprising using two electromagnetic transmitter antennas for inducing an electromagnetic signal having a frequency in the formation and detecting the induced signal in two electromagnetic receiver antennas, the two transmitters symmetrically disposed about the two receivers on the non-rotating pad.

31. A method of determining, while drilling a borehole with a drilling assembly, a parameter of interest of the formation surrounding the borehole, comprising:
a) using a plurality of substantially non-rotating sensors at known positions on the outside of the assembly to obtain data relating to the parameter of interest;
(b) transmitting from a surface control device information about the depth of the drilling assembly to a telemetry device on the drilling assembly;
(c) obtaining the orientation of the plurality of sensors by using a directional sensor disposed in the assembly;
(d) processing the data about the parameter of interest in a processor disposed in the drilling assembly by using the orientation of the sensors and the information about the depth of the drilling assembly to give processed data about the parameter of interest; and
(e) transmitting said processed data about the parameter of interest to the surface using a telemetry device on the drilling assembly.

32. The method of claim 31 wherein the plurality of sensors rotate with a drill bit on the drilling assembly.

33. The method of claim 32 wherein the plurality of sensors are mounted on a substantially non-rotating sleeve on the drilling assembly.

34. The method of claim 31 further comprising conveying the drilling assembly on one of: (i) a drillstring, and (ii) coiled tubing.

35. The method of claim 31 wherein the processing includes computing a rate of penetration of the drilling tool.

36. The method of claim 31 wherein the processing comprises combining data measurements recorded within a depth and azimuth sampling interval.

37. The method of claim 31 wherein the processing comprises discarding redundant data measurements recorded within a depth and azimuth sampling interval.

38. A method of obtaining a seismic image of the subsurface near a borehole while drilling the borehole, said method comprising:
(a) placing a plurality of seismic detectors at a location away from the borehole;
(b) placing at least one seismic transmitter on a substantially non-rotating sleeve on a drilling assembly conveyed in the borehole, said transmitters being in contact with the borehole wall;
(c) using a processor on the drilling assembly to activate the plurality of transmitters and exciting seismic waves having a waveform in the formation at a selected time;
(d) communicating information about the selected time to a processor;
(e) recording the seismic waves excited in the formation by the at least one seismic transmitter at the plurality of seismic detectors; and
(f) processing the recorded seismic waves in the processor to form an image of the subsurface.

39. The method of claim 38, wherein the plurality of transmitters comprise three-component transmitters and the seismic detectors comprise three-component detectors, the method further comprising determining an orientation of the transmitters using a directional sensor; and communicating the orientation of the transmitters to the processor.

40. The method of claim 38 wherein the waveform of the seismic waves excited by the transmitters is substantially a swept frequency signal.

* * * * *